United States Patent
Takahashi

(10) Patent No.: US 9,440,165 B2
(45) Date of Patent: Sep. 13, 2016

(54) CRYOPUMP AND METHOD FOR REGENERATING THE CRYOPUMP

(71) Applicant: SUMITOMO HEAVY INDUSTRIES, LTD., Tokyo (JP)

(72) Inventor: Kakeru Takahashi, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 697 days.

(21) Appl. No.: 13/782,420

(22) Filed: Mar. 1, 2013

(65) Prior Publication Data
US 2013/0227968 A1  Sep. 5, 2013

(30) Foreign Application Priority Data
Mar. 1, 2012  (JP) .................... 2012-045268

(51) Int. Cl.
*B01D 8/00* (2006.01)
*F04B 37/08* (2006.01)
*F04B 37/06* (2006.01)

(52) U.S. Cl.
CPC ............. *B01D 8/00* (2013.01); *F04B 37/06* (2013.01); *F04B 37/08* (2013.01); *F04B 37/085* (2013.01)

(58) Field of Classification Search
CPC ........ F04B 37/08; F04B 37/085; F04B 37/06; B01D 8/00
USPC .......................................... 62/55.5
See application file for complete search history.

(56) References Cited

FOREIGN PATENT DOCUMENTS

JP    11-324916 A    11/1999

OTHER PUBLICATIONS

Machine Translation of Detailed Description of JP11-324916; retreived on Feb. 2016.*

* cited by examiner

*Primary Examiner* — Orlando Aviles Bosques
(74) *Attorney, Agent, or Firm* — Michael Best and Friedrich

(57) ABSTRACT

A method for regenerating a cryopump includes stopping a pressure sensor for the cryopump, starting to heat a cryogenic surface for adsorbing gas molecules, starting the rough evacuation of the cryopump while the pressure sensor is stopped, and terminating the rough evacuation while the pressure sensor is stopped. This method may include activating the pressure sensor after the rough evacuation has been terminated.

5 Claims, 4 Drawing Sheets

CRYOPUMP AND METHOD FOR REGENERATING THE CRYOPUMP

BACKGROUND OF THE INVENTION

1. Field of the Invention

The present invention relates to a cryopump and a method for regenerating the cryopump.

2. Description of the Related Art

A cryopump is a vacuum pump that traps and pumps gas molecules by condensing or adsorbing them on cryopanels cooled to ultracold temperatures. The cryopump is generally used to attain a clean vacuum environment required for a semiconductor circuit manufacturing process, for instance. The cryopump, which is a so-called entrapment vacuum pump, needs regeneration by which the trapped gas is periodically released to the outside.

It is known that, during regeneration, a first vacuum gauge is used when the pressure of a casing for the cryopump is low and a second vacuum gauge is used when the pressure thereof is high. The first vacuum gauge has a filament, whereas the second vacuum gauge does not have the filament. During regeneration, inflammable gas and combustion enhancing gas are released from cryopanels. When the pressure becomes high, the first vacuum gauge is turned off, so that the source of ignition can be eliminated.

In the above configuration, however, the release of gas from the cryopanels starts already before the first vacuum gauge is switched off. A risk that ignition occurs by accident remains plausible if the source of ignition and the inflammable gas coexist. For example, the heating of cryopanels for regeneration may start, inflammable gas adsorbed may be released at a rapid pace, or a combustible gas composition may be generated in the cryopump. It is not guaranteed that in such cases the first vacuum gauge has already been switched off.

SUMMARY OF THE INVENTION

According to an aspect of the present invention, there is provided a cryopump including: a cryopanel having an adsorption region for adsorbing gas molecules; a cryopump housing arranged to enclose the cryopanel; a rough valve configured to connect the cryopump housing to a roughing pump; a pressure sensor configured to measure an internal pressure in the cryopump housing; and a control unit configured to control a stopped period of the pressure sensor and regeneration of the cryopanel, wherein the control unit sets the stopped period for an initial stage of the regeneration and causes the rough valve to open for rough evacuation of the cryopump housing at least once during the stopped period.

According to an aspect of the present invention, there is provided a method for regenerating a cryopump. The method includes: stopping a pressure sensor for the cryopump; starting to heat a cryogenic surface for adsorbing gas molecules; starting rough evacuation of the cryopump while the pressure sensor is stopped; and terminating the rough evacuation while the pressure sensor is stopped.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1:
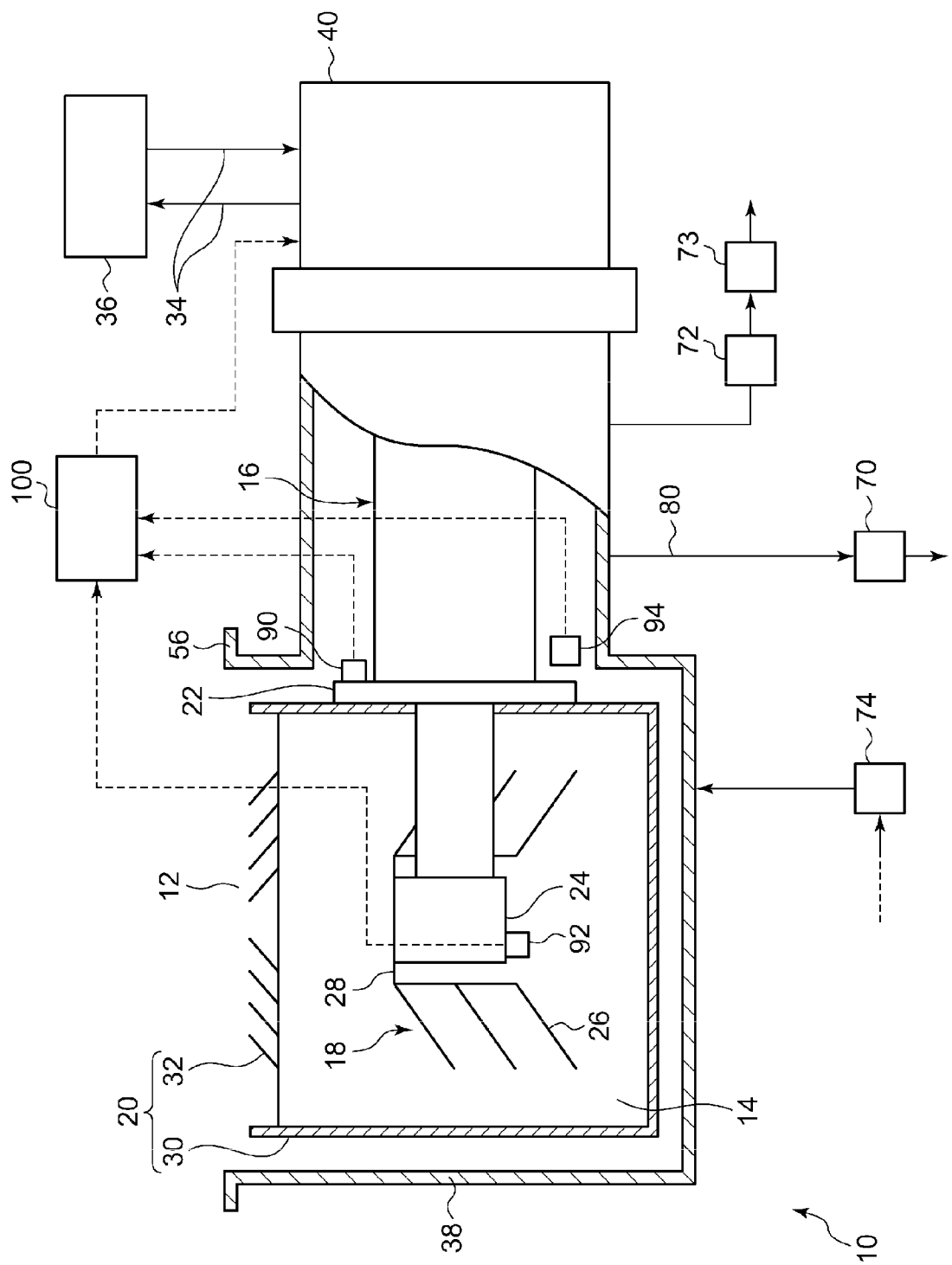
FIG. 1 is a schematic diagram showing a structure of a cryopump according to an embodiment of the present invention.

The invention will now be described by reference to the preferred embodiments. This does not intend to limit the scope of the present invention, but to exemplify the invention.

One of illustrative purposes of one embodiment of the present invention is to improve the safety concerning the regeneration of a cryopump.

A cryopump according to one embodiment of the present invention includes a cryopanel having an adsorption region for adsorbing gas molecules, a cryopump housing for enclosing the cryopanel, a rough valve connecting the cryopump housing to a roughing pump, a pressure sensor for measuring an internal pressure in the cryopump housing, and a control unit for controlling a stopped period of the pressure sensor and regeneration of the cryopanel. The control unit sets the stopped period in an initial stage of the regeneration and causes the rough valve to open for rough evacuation of the cryopump housing at least once during the stopped period.

A gas that has been adsorbed is released from the cryopanel from the very beginning of the regeneration. Stopping the pressure sensor can eliminate the risk of the pressure sensor being possibly a source of ignition in the initial stage of the regeneration. The gas adsorbed often contains inflammable gas. Such a gas can be discharged from the cryopump by rough evacuation while the pressure sensor is stopped. Thus, the coexistence of a plurality of risk factors, namely, the source of ignition and the inflammable gas, can be avoided. This will improve the safety of the cryopump.

The control unit may activate the pressure sensor upon the passage of the stopped period. The control unit may operate the pressure sensor in a second stage of the regeneration where the internal pressure of the cryopump housing is permitted to exceed 100 Pa.

This can activate the pressure sensor when the inflammable gas, released from the cryopanel at the beginning of the regeneration, has been discharged. Hence, the pressure sensor can be used safely in a subsequent process after the initial stage of regeneration where the internal pressure of the cryopump may become considerably higher than when the vacuum pumping operation is being performed.

The cryopump may further include a temperature sensor for measuring a temperature of the cryopanel. The control unit may execute a heating control of the cryopanel, in the initial stage, toward a target temperature higher than a temperature at which adsorbed gas molecules are released from the adsorption region. The control unit may execute the rough evacuation, during the heating control, when a temperature measured by the temperature sensor exceeds the temperature at which adsorbed gas molecules are released.

The stopped period includes a period from immediately before a start of the regeneration to a closing of the rough valve.

In this way, the rough evacuation is executed after the cryopanel is heated and the adsorbed gas is released. Thus the most part of such gas adsorbed can be discharged. Since the pressure sensor is stopped until the rough valve has been closed, the pressure sensor can be activated after the rough evacuation has been completed.

The cryopump may further include a purge valve for connecting the cryopump housing to a purge gas source. The control unit may open the purge valve, in the initial stage, to purge the cryopump housing and may discontinue the purge by closing the purge valve while the rough valve is open. The control unit may execute the purge and the rough evacuation a plural number of times during the stopped period.

The operation of heating the cryopanel with the purge gas accelerates the releasing of gas from the cryopanel. Further, the gas released is diluted with the purge gas. A low-concentration gas diluted therewith is discharged through the rough evacuation. This further reduces the possibility of gas being combusted inside the cryopump. Also, executing a purge and rough operation a plurality of times ensures that the gas is of sufficiently low concentration in this process.

The cryopump may further include a vent valve for releasing the internal pressure of the cryopump housing outside. The control unit may determine whether to open the vent valve or not, based on a result of measurement by the pressure sensor, in a second stage of the regeneration.

Opening the vent valve allows the internal pressure of the cryopump housing to be released to the outside. This can prevent an excessively high pressure from occurring inside the cryopump. This also helps improve the safety of the cryopump.

The control unit may execute a rough-and-purge, in the second stage of the regeneration, in which the rough evacuation of the cryopump housing and the supply of purge gas to the cryopump housing are performed sequentially. The stopped period may be so set that an activation of the pressure sensor is completed before a start of the rough and purge. The rough and purge operation promotes the melting of ice accumulated in the cryopump and is useful in efficiently regenerating water. The rough and purge can be executed while the pressure is monitored by the pressure sensor.

Another embodiment of the present invention relates to a method for regenerating a cryopump. The method includes stopping a pressure sensor for the cryopump, starting to heat a cryogenic surface for adsorbing gas molecules, starting rough evacuation of the cryopump while the pressure sensor is stopped, and terminating the rough evacuation while the pressure sensor is stopped.

Increasing the temperature releases the adsorbed gas from the cryogenic surface. Stopping the pressure sensor eliminates the risk where the pressure sensor is possibly a source of ignition for the gas. The released gas is discharged from the cryopump while the pressure sensor is stopped. Thus, the coexistence of a plurality of risk factors can be avoided, in which case the safety of the cryopump is improved.

The method may further include activating the pressure sensor after the rough evacuation has been terminated. The method may further include discharging gas, which has been accumulated in the cryopump, outside while monitoring with the pressure sensor.

FIG. 1 is a schematic diagram showing a structure of a cryopump 10 according to an embodiment of the present invention. The cryopump 10, which is installed in a vacuum chamber such as ion implantation apparatus and a sputtering apparatus, is used to raise the degree of vacuum inside the vacuum chamber up to a level required by a desired process. The cryopump 10 is particularly suited for a cryopump for mainly discharging a hydrogen gas.

The cryopump 10 has an inlet 12 for receiving a gas. The inlet 12 is an entrance to an internal space 14 of the cryopump 10. The gas to be discharged from the vacuum chamber to which the cryopump 10 is attached enters into the internal space 14 of the cryopump 10 through the inlet 12.

It is to be noted that the terms "axial direction" and "radial direction" will be used as appropriate in the following description to clearly show the positional relationships between the constituent parts of the cryopump 10. The axial direction represents a direction passing through the inlet 12, whereas the radial direction represents a direction along the inlet 12. For reasons of expediency, positions axially closer to the inlet 12 may sometimes be described as "above", and positions axially farther from the inlet 12 as "below". That is, positions relatively farther from the bottom of the cryopump 10 may sometimes be described as "above", and positions relatively closer thereto as "below". With respect to the radial direction, positions closer to the center of the inlet 12 may sometimes be described as "inside", and positions closer to the periphery of the inlet 12 as "outside". It is to be noted, however, that these descriptions do not apply to the locations of the cryopump 10 that is mounted on the vacuum chamber. For example, the cryopump 10 may be mounted vertically on the vacuum chamber with the inlet 12 facing downward.

FIG. 1 shows a cross section taken along the central axis of the internal space 14 of the cryopump 10 and a refrigerator 16. The cryopump 10 includes a refrigerator 16, a second panel 18, and a first panel 20.

The refrigerator 16 is a cryogenic refrigerator such as a Gifford-McMahon refrigerator (so-called GM refrigerator), for instance. The refrigerator 16 is a two-stage type refrigerator having a first stage 22 and a second stage 24.

The refrigerator 16 is connected to a compressor 36 through refrigerant pipes 34. The compressor 36 supplies a high-pressure operating gas to the refrigerator 16. The high-pressure operating gas creates cold by undergoing adiabatic expansion in the expansion chamber of the refrigerator 16. The compressor 36 compresses the low-pressure operating gas that returns from the refrigerator 16. The operating gas is helium, for instance. The switching of the flow of operating gas from the compressor 36 to the refrigerator 16 or from the refrigerator 16 to the compressor 36 is performed by a rotary valve (not shown) within the refrigerator 16. The refrigerator 16 is equipped with a valve drive motor 40. The valve drive motor 40 rotates the rotary valve with power supplied from an external power source.

The refrigerator 16 is so configured as to cool the first stage 22 to a first temperature level and the second stage 24 to a second temperature level. The second temperature level is lower than the first temperature level. For example, the first stage 22 is cooled to about 65 K to 120 K, preferably to 80 K to 100 K, whereas the second stage 24 is cooled to about 10 K to 20 K.

The cryopump 10 shown in FIG. 1 is a so-called horizontal-type cryopump. The horizontal-type cryopump is a cryopump arranged at a predetermined position such that the refrigerator 16 generally intersects (usually at right angles) with the central axis of the internal space 14 of the cryopump 10. The present embodiment may also be applicable to a so-called vertical-type cryopump in a similar manner. The vertical-type cryopump is a cryopump arranged at a predetermined position along the axial direction of the cryopump.

The second panel 18 is disposed in the central area of the internal space 14 of the cryopump 10. The second panel 18 includes a plurality of panel members 26, for instance. The panel members 26 have each a lateral side shaped like a truncated cone, or an umbrella shape, for instance. Each of the panel members 26 is normally provided with an adsorbent (not shown) such as charcoal. The adsorbent is bonded to the back face of the panel member 26, for instance. In this manner, the second panel 18 is provided with adsorption areas for adsorbing gas molecules.

The panel members 26 are mounted to a panel mounting member 28. The panel mounting member 28 is attached to the second stage 24. Thus the second panel 18 is thermally coupled to the second stage 24. Accordingly, the second panel 18 is cooled to the second temperature level.

The first panel 20 is disposed outside the second panel 18. The first panel 20, including a radiation shield 30 and an inlet cryopanel 32, encloses the second panel 18. The first panel 20 is thermally coupled to the first stage 22. Therefore the first panel 20 is cooled to the first temperature level.

The radiation shield 30 is provided to protect the second panel 18 against the radiation heat from a housing 38 of the cryopump 10. The radiation shield 30, which is disposed between the housing 38 and the second panel 18, encloses the second panel 18. An upper end of the radiation shield 30 in the axial direction is open toward the inlet 12. The radiation shield 30 has a cylindrical shape (e.g. circular cylinder) the lower end of which is occluded, and thus the radiation shield 30 is of a cup-like shape. On the side of the radiation shield 30, there is a hole through which the refrigerator 16 is mounted. The second stage 24 is inserted inside the radiation shield 30 through the hole. The first stage 22 is fixed on the exterior surface of the radiation shield 30 at the periphery of the mounting hole. In this manner, the radiation shield 30 is thermally coupled to the first stage 22.

The inlet cryopanel 32 is disposed axially above the second panel 18 and along the radial direction on the inlet 12. The inlet cryopanel 32, with its outer periphery secured to the opening end of the radiation shield 30, is thermally coupled to the radiation shield 30. The inlet cryopanel 32 is formed into a louver structure or a chevron structure, for instance. The inlet cryopanel 32 may be formed concentrically with the central axis of the radiation shield 30 or may be formed into a grid-like or any other shape.

The inlet cryopanel 32 is provided for the evacuation of gas entering the inlet 12. The gas that condenses at the temperature of the inlet cryopanel 32 (e.g., moisture) is captured on the surface of the inlet cryopanel 32. The inlet cryopanel 32 is provided also for the protection of the second panel 18 from the radiation heat from heat sources outside the cryopump 10 (e.g., a heat source inside the vacuum chamber to which the cryopump 10 is attached). The inlet cryopanel 32 also restricts the entry of not only the radiation heat but also gas molecules. The inlet cryopanel 32 occupies part of the opening area of the inlet 12, thereby limiting the entry of gas into the internal space 14 through the inlet 12 to a desired amount.

The cryopump 10 is provided with the housing 38. The housing 38 is a vacuum vessel separating the inside of the cryopump 10 from the outside. The housing 38 is so configured as to maintain the pressure inside the internal space 14 of the cryopump 10 airtight. The housing 38 holds the first panel 20 and the refrigerator 16 therewithin. The housing 38, which is provided outside the first panel 20, encloses the first panel 20. Also, the housing 38 has the refrigerator 16 therewithin. In other words, the housing 38 is a cryopump housing enclosing the first panel 20 and the second panel 18.

The housing 38 is secured to a part of the equipment remaining at the ambient temperature (e.g., high-temperature part of the refrigerator 16) in such a manner that the housing 38 does not come into contact with any low-temperature part of the first panel 20 and the refrigerator 16. The external surfaces of the housing 38, which are exposed to the outside environment, have temperatures higher than the first panel 20 which is cooled (e.g., about room temperature).

Also, the housing 38 has an inlet flange 56 extending radially outward from the opening end thereof. The inlet flange 56 serves as a flange by which to mount the cryopump 10 to the vacuum chamber. A gate valve (not shown) is provided at the opening of the vacuum chamber, and the inlet flange 56 is attached to the gate valve. Therefore, the gate valve is located axially above the inlet cryopanel 32. For example, the gate valve is closed when the cryopump 10 is regenerated, and the gate valve is opened when the vacuum chamber is evacuated by the cryopump 10.

A vent valve 70, a rough valve 72, and a purge valve 74 are connected to the housing 38.

The vent valve 70 is provided at one end of an exhaust line 80 for exhausting fluid from the internal space of the cryopump 10 to an external environment, for instance. Opening the vent valve 70 permits the flow of the exhaust line 80, whereas closing the vent valve 70 blocks the flow of the exhaust line 80. Though fluid to be discharged through the vent valve 70 is basically a gas, it may be liquid or a mixture of liquid and gas. For example, liquefied gas that has been condensed by the cryopump 10 may be mixed in the fluid to be discharged. Opening the vent valve allows a positive pressure occurring within the housing 38 to be released to the outside.

The rough valve 72 is connected to a roughing pump 73. Opening the rough valve 72 has the roughing pump 73 and the cryopump 10 communicate with each other, whereas closing the rough valve 72 cuts off the passage between the roughing pump 73 and the cryopump 10. The roughing pump 73 is typically provided as a vacuum apparatus separate from the cryopump 10, and constitutes part of a vacuum system, including the vacuum chamber, which is connected to the cryopump 10.

The purge valve 74 is connected to a purge gas supply apparatus (not shown). The purge gas is a nitrogen gas, for instance. The supply of purge gas to the cryopump 10 is controlled by the on and off of the purge valve 74.

The cryopump 10 includes a first temperature sensor 90 for measuring the temperature of the first stage 22 and a second temperature sensor 92 for measuring the temperature of the second stage 24. The first temperature sensor 90 is mounted to the first stage 22. The second temperature sensor 92 is mounted to the second stage 24.

A pressure sensor 94 is provided inside the housing 38. The pressure sensor 94 is located outside the first panel 20 and is provided near the refrigerator 16, for instance. The pressure sensor 94 periodically measures the pressure of the housing 38 and outputs a signal indicating the thus measured pressure to a control unit 100. The pressure sensor 94 is connected to the control unit 100 so that the signal outputted from the pressure sensor 94 can be communicated with control unit 100.

The pressure sensor 94 has a wide range of measurements including both a high vacuum level attained by the cryopump 10 and the atmospheric pressure level. This range of measurements preferably includes at least a range of pressures that can possibly take on during a regeneration process. Thus the lower limit of the range of measurements in the pressure sensor 94 may be on the order of 1 Pa (or 10 Pa), for instance, and the upper limit thereof may be on the order of $10^5$ Pa, for instance.

The pressure sensor 94 may be a thermal conductivity gauge, for instance. The thermal conductivity gauge as used herein may be a Pirani gauge or thermocouple vacuum gauge (TC gauge), for instance. The pressure sensor 94 may also be a hot cathode ionization gauge. The hot cathode ionization gauge may be a triode vacuum gauge or B-A vacuum gauge, for instance. Such vacuum gauges as listed above have fine conductive wires (e.g., filament) exposed to a measurement environment. When the vacuum gauge is activated, the power is supplied to the filament; when the vacuum gauge is stopped, the power supplied thereto is stopped.

The cryopump 10 includes the control unit 100. The control unit 100 may be provided integrally with the cryopump 10 or may be configured as a separate body separated from the cryopump 10.

The control unit 100 is so configured as to control the refrigerator 16 to carry out a vacuum pumping operation and a regeneration operation of the cryopump 10. Also, the control unit 100 mainly controls the opening and closing of the vent valve 70, the rough valve and the purge valve 74, as necessary, during regeneration. The control unit 100 is configured such that the measurement results of various sensors such as the first temperature sensor 90, the second temperature sensor 92, and the pressure sensor 94 can be received. Based on those measurement results, the control unit 100 computes instructions given to the refrigerator 16 and the valves.

In the vacuum pumping operation, the control unit 100 controls the refrigerator 16 in such a manner, for example, that a stage temperature (e.g., first-stage temperature) follows a target cooling temperature. The target temperature of the first stage 22 is typically set to a constant value. The target temperature of the first stage 22 is determined to be a certain value as specifications according to a process performed in the vacuum chamber attached to the cryopump 10.

An operation of the cryopump 10 configured as above is now explained hereunder. As the cryopump 10 is to be operated, the interior of the cryopump 10 is first roughly evacuated to an operation start pressure (e.g., about 1 Pa) by using the roughing pump 73 through the rough valve 72 before the operation starts. Then the cryopump 10 is operated. The first stage 22 and the second stage 24 are cooled under the control of the control unit 100 by driving the refrigerator 16. This also cools the first panel 20 and the second panel 18 that are thermally coupled to the first stage 22 and the second stage 24, respectively.

The inlet cryopanel 32 cools gas molecules coming from the vacuum chamber into the cryopump 10 and condenses a gas, whose vapor pressure gets sufficiently low by this cooling temperature (e.g., water or the like), on the surface of the inlet cryopanel 32 so as to be discharged. On the other hand, a gas, whose vapor pressure does not become sufficiently low by the cooling temperature of the inlet cryopanel 32, passes through the inlet cryopanel 32 and enters inside the radiation shield 30. Of the gas has entered inside the radiation shield 30, gas whose vapor pressure becomes sufficiently low by the cooling temperature of the second panel 18 is condensed for removal on the surface of the second panel 18. A gas, whose vapor pressure does not become sufficiently low even by the cooling temperature of the second panel 18 (e.g., hydrogen or the like), is adsorbed for removal by adsorbents adhered to the cooled surface of the second panel 18. In this manner, the cryopump 10 can attain a desired degree of vacuum in the vacuum chamber attached to the cryopump 10.

As the pumping operation continues, the gas is accumulated in the cryopump 10. In order that the accumulated gas can be discharged to the outside, the cryopump 10 is regenerated when a predetermined regeneration-start condition is met. The regeneration-start condition includes a condition where a predetermined length of time has elapsed after the start of the pumping operation, for instance. The regeneration includes a heating process (temperature-raising process), a discharging process, and a cooling process. Thus, an initial stage of regeneration mainly includes the heating process. A second stage (halfway stage) of regeneration mainly includes the discharging process. A final stage of regeneration mainly includes the cooling process.

The regeneration process of the cryopump 10 is controlled by the control unit 100, for instance. The control unit 100 determines if the predetermined regeneration-start condition has been met, and starts the regeneration if the condition is met. If the condition is not met, the control unit 100 will not start the regeneration and continue the vacuum pumping operation.

Figure 2:
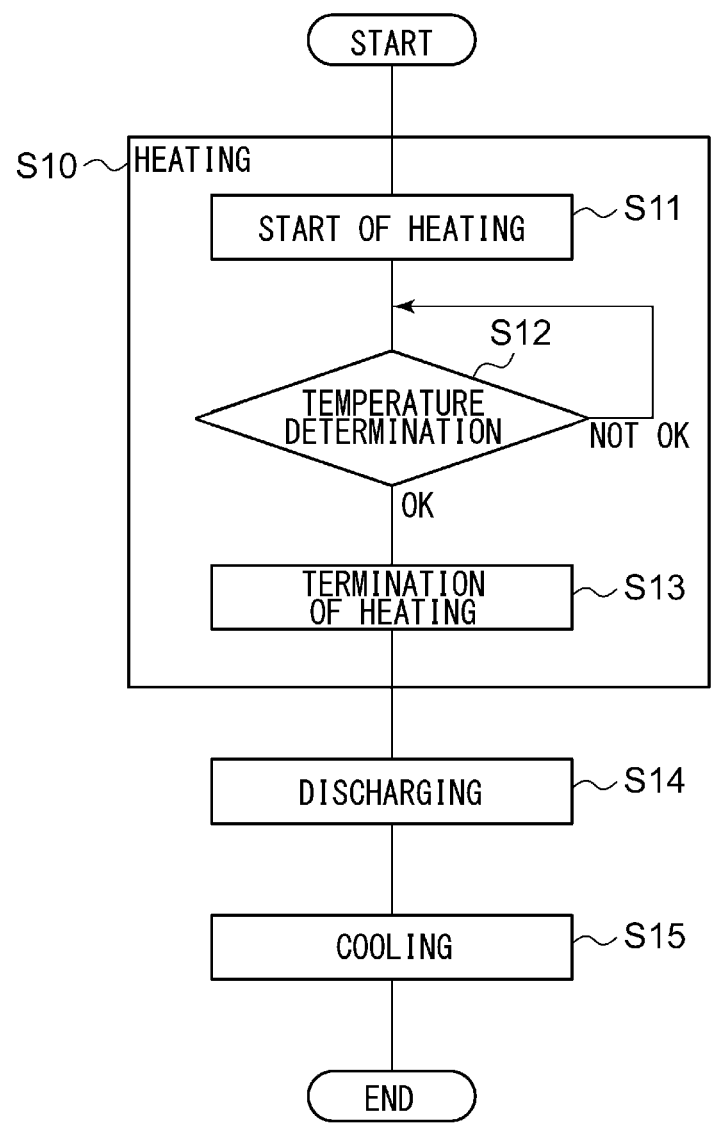
FIG. 2 a flowchart to explain a regeneration method according to an embodiment of the present invention.

FIG. 2 a flowchart to explain a regeneration method according to an embodiment of the present invention. The regeneration includes the heating process of raising the temperature of the cryopump 10 to a regeneration temperature, which is higher than the temperature of the cryopanel during the pumping operation (S10). The exemplary regeneration process shown in FIG. 2 is a so-called "full regeneration". The full regeneration regenerates all cryopanels including the first panel 20 and the second panel 18. The cryopanels are heated starting from the cooling temperature required for the vacuum pumping operation up to the regeneration temperature. Here, the regeneration temperature is a room temperature or slightly higher than the room temperature, for instance (e.g., about 290 K or about 300 K).

The heating process according to the present embodiment is performed by a heating operation of the refrigerator 16, namely a so-called reversal heating of the refrigerator 16. The reversal heating is done as follows. That is, the rotary valve in the refrigerator 16 is rotated in a direction reverse to that of a cooling operation, and thereby the timings of intake and exhaust of the operating gas are made to differ so that the operation gas can undergo adiabatic compression. The refrigerator 16 heats up the first stage 22 and the second stage 24 through the obtained compression heat. The first panel 20 is heated with the first stage 22 as the heat source, whereas the second panel 18 is heated with the second stage 24 as the heat source. Note here that the heating process may be carried out by use of a heater installed in the refrigerator 16.

As illustrated in FIG. 2, the control unit 100 performs a start of heating (S11), a temperature determination (S12), and a termination of heating (S13) as the heating process (temperature-raising process). The control unit 10 performs the temperature-raising start (S11) on the condition that the start of raising the temperature has been permitted (S22 of FIG. 3). As will be discussed later, the pressure sensor 94 is turned off before the temperature-raising process starts (S20 of FIG. 3).

The process step of the start of heating includes starting the heating operation of the refrigerator 16, for instance. To raise the temperature of the cryopanel at high speed, the control unit 100 controls the refrigerator 16 at a maximum operating frequency, for instance, in the reversal heating. Also, the start of heating includes starting to supply the purge gas to the cryopump 10 as necessary. The control unit 100 opens the purge valve 74 so as to introduce the purge gas into the internal space 14 of the cryopump 10. The purge gas thus supplied is discharged from the cryopump 70 through the vent valve 70.

The control unit 100 performs temperature determination (S12). The temperature determination is a process step that monitors the temperatures measured by the first temperature sensor 90 and the second-stage temperature sensor 92 during the heating operation of refrigerator 16. The control unit 100 determines whether or not the temperatures measured by the first temperature sensor 90 and the second temperature sensor 92 have reached the respective target temperatures. The target temperatures are selected from the aforementioned regeneration temperatures (e.g., about 290 K or about 300 K). Notice here that a first-stage target temperature and a second-stage target temperature may be identical or different from each other.

More specifically, the control unit 100 determines if the temperature measured by the second temperature sensor 92 has reached the second-stage target temperature. If the temperature measured by the second temperature sensor 92 has reached the target temperature, the control unit 100 determines that the cryopump 10 has been heated to the target temperature. Alternatively, the control unit 100 may determine that the cryopump 10 has been heated to the target temperature if the temperatures measured by the first temperature sensor 90 and the second temperature sensor 92 have reached the first-stage target temperature and the second-stage target temperature, respectively.

If it is determined that the cryopump 10 has not reached the target temperature ("NOT OK" in S12), the control unit 100 will continue the heating process. The heating operation of the refrigerator 16 and the supply of purge gas continue. After a predetermined length of time has elapsed (e.g., at the next control cycle), the control unit 100 performs stage temperature determination again (S12).

If it is determined that the cryopump 10 has reached the target temperature ("OK" of S12), the control unit 100 will terminate the process of raising the temperature (S13). The control unit 100 stops the operation of the refrigerator 16. The control unit 100 may continue the supply of purge gas for a predetermined duration of time (so-called "extended purge") or may stop the supply of purge gas simultaneously with stopping the operation of the refrigerator 16.

After the heating process has been completed, the control unit 100 starts the discharging process (S14). In the discharging process, the gas re-vaporized from the surface of the cryopanels is discharged outside the cryopump 10. The re-vaporized gas is discharged outside via the exhaust line 80 or the roughing pump 73, for instance. The re-vaporized gas is discharged, together with the purge gas introduced, from the cryopump 10 as necessary. The operation of the refrigerator 16 is stopped during the discharging process.

As will be described later, the pressure sensor 94 is in operation in the discharging process. Thus, the control unit 100 determines whether or not a positive pressure has occurred inside the housing 38 relative to the exterior of the housing 38, based on the values measured by the pressure sensor 94. And if the control unit 100 determines that the positive pressure has occurred, the vent valve 70 will be opened. This allows a high pressure inside the cryopump 10 to be released to the outside via the exhaust line 80. If the control unit 100 determines that the positive pressure does not occur, the vent valve 70 will be closed. In this manner, the leakage into the housing 38 is sealed off while the interior of the housing 38 is depressurized.

In the discharging process, the control unit 100 also determines whether or not the gas has been completely discharged, based on the value measured by the pressure sensor 94, for instance. For example, the control unit 100 continues the discharging process as long as the pressure inside the cryopump 10 exceeds a predetermined threshold value. And if the pressure falls below the predetermined threshold, the control unit 100 will stop the discharging process and start the cooling process.

In the cooling process, the cryopanels are cooled again in order to resume the vacuum pumping operation (S15). The cooling operation of the refrigerator 16 is started. The control unit 100 determines whether or not the measured value of a stage temperature has reached a target cooling temperature necessary for the vacuum pumping operation. The control unit 100 continues the cooling process until the measured value thereof reaches the target cooling temperature. If the measured value has reached the target cooling temperature, the control unit 100 will stop the cooling process. This completes the regeneration process. The vacuum pumping operation of the cryopump 10 is resumed.

If the filament of the pressure sensor 94 is broken after a lengthy operation of the cryopump 10 for example, a spark may occur. If inflammable gas is around the filament then, the broken filament may become the source of ignition. It is therefore vital to avoid the coexistence of a plurality of risk factors in order to decrease the possibility of an accident.

The present embodiment is developed based on the concern for the safely. The operation process of the cryopump 10 is designed, for example, so that the filament does not come in contact with inflammable gas in an occasion where there is a possibility that the filament is broken. Also, the operation process is designed so that the filament does not break when inflammable gas is in contact with the filament.

A typical inflammable gas is hydrogen. During the vacuum pumping operation, hydrogen gas is adsorbed by the adsorbent of the second panel 18 cooled to a cryogenic temperature. Thus almost no hydrogen gas is around the pressure sensor 94. In the regeneration, however, the most part of gas adsorbed is released into the housing 38 in a phase when the second panel 18 is slightly heated at the very beginning of the regeneration. When, for example, the second-stage temperature has reached 30 K, most of the gas adsorbed is released. At the beginning of the regeneration in a typical cryopump, a length of time until when the second-stage temperature rises to 30 K is a few minutes.

Thus, the regeneration method according to the present embodiment includes stopping the pressure sensor 94 beforehand at the start of the regeneration. More specifically, at the start of raising the temperature of the second panel 18, the pressure sensor 94 is stopped. While the pressure sensor 94 is stopped, no current flows through the filament. As a result, the pressure sensor 94 cannot be the source of ignition even if the housing 38 is filled with hydrogen gas due to the heated second panel 18.

The regeneration method according to the present embodiment also includes rough evacuation of the cryopump 10 while the pressure sensor 94 is stopped. The rough evacuation removes hydrogen from around the pressure sensor 94. The regeneration method according to the present embodiment further includes starting the pressure sensor 94 after the rough evacuation, and discharging gas, which has been accumulated in the cryopump 10, outside while it is monitored by the pressure sensor 94. Since hydrogen gas has been removed, the pressure sensor 94 is safe to use.

Figure 3:
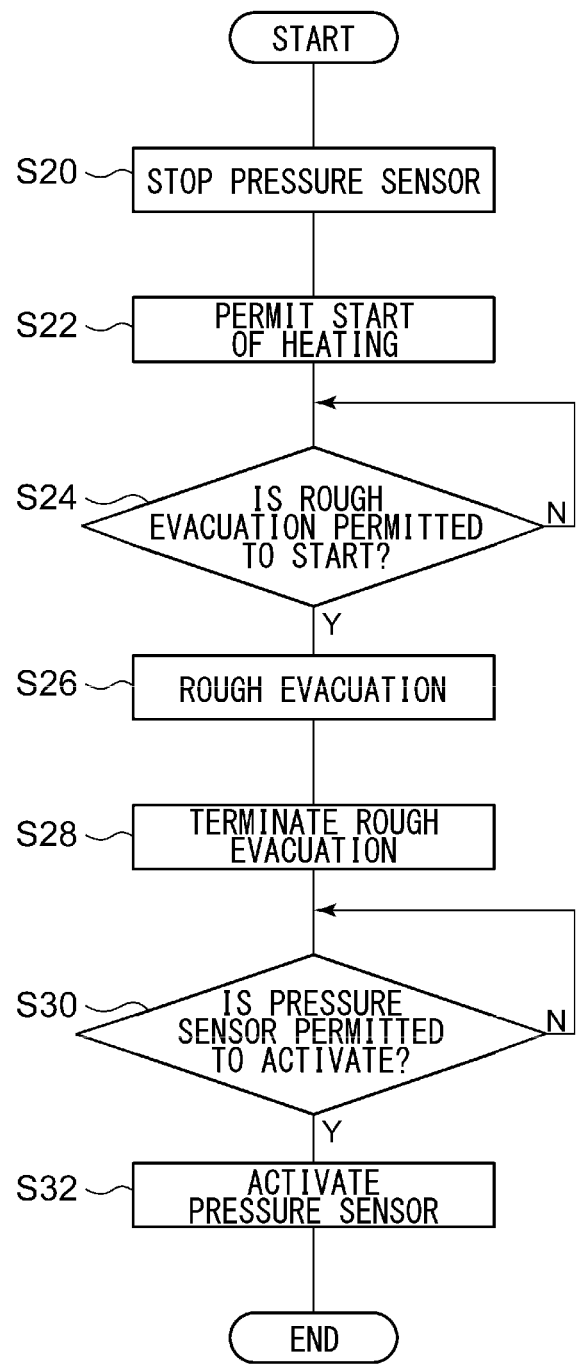
FIG. 3 is a flowchart to explain an initial stage of regeneration according to an embodiment of the present invention.

FIG. 3 is a flowchart to explain an initial stage of regeneration according to an embodiment of the present invention. The procedure depicted in FIG. 3 includes a stopping/restarting processing of the pressure sensor 94 and a roughing/purge processing. Also, the procedure depicted in FIG. 3 is generally carried out in parallel with the heating process (S10 of FIG. 2) and will be completed before the start of the discharging process (S14 of FIG. 2).

As shown in FIG. 3, as the procedure starts, the control unit 100 stops the pressure sensor 94 (S20). After that, the pressure sensor 94 continues to be turned off until it is restarted. After the pressure sensor 94 has been stopped completely, the control unit 100 issues a permission to start increasing the temperature (S22). For example, the control unit 100 sets a temperature-raising start permission flag, for instance. As described above, the control unit 100 starts the temperature-raising process (heating process) (S10) on the condition that the permission of the temperature-raising start has been granted.

The control unit 100 decides on the start of rough evacuation (S24). For example, the control unit 100 determines whether or not the measured temperature of the second panel 18 exceeds a threshold temperature (e.g., 30 K) at which hydrogen stored is sufficiently released. The measured temperature of the second panel 18 is a value measured by the second temperature sensor 92. Alternatively, the control unit 100 may determine whether or not a setup time counted from the start of the heating process has been reached. The setup time is set based on a length of time required for the measured temperature of the second panel 18 to reach the aforementioned threshold temperature.

If the measured temperature does not reach the threshold temperature (N of S24), the control unit 100 will again decide on the start of rough evacuation after a predetermined length of time has elapsed (e.g., at the next control cycle) (S24). If, on the other hand, the measured temperature reaches the threshold temperature (Y of S24), rough evacuation will be executed (S26). The control unit 100 closes the purge valve 74 and opens the rough valve 72. Thereby, the cryopump 10 is depressurized below the atmospheric pressure by about 0.01 atm, for instance.

The control unit 100 continues to open the rough valve 72 for a preset roughing time (e.g., several tens of seconds or a few minutes) and then stops the rough evacuation (S28). The control unit 100 closes the rough valve 72. The control unit 100 opens the purge valve 74 and resumes the purge. This corresponds to the second round of purge.

The control unit 100 determines whether or not the pressure sensor 94 is to be activated (S30). For example, the control unit 100 determines whether or not a preset stopped period of the pressure sensor 94 has elapsed. If the preset stopped period thereof has not elapsed (N of S30), the control unit will determine again whether or not the preset stopped period has elapsed, after a predetermined length of time has elapsed (e.g., at the next control cycle) (S30). If the preset stopped period has elapsed (Y of S30), the control unit 100 will activate the pressure sensor 94. This completes the procedure depicted in FIG. 3.

The stopped period of the pressure sensor 94 is set such that the activation of the pressure sensor 94 is completed before a process using the pressure sensor 94 starts in the regeneration. The time period of sensor stoppage is so set as to include a period from immediately before the start of the regeneration to the closing of the rough valve 72. For example, the stopped period is from the realization of the regeneration-start condition until the closing of the rough valve 72 (or until the opening of the purge valve 74 in conjunction with the closing of the rough valve 72). In this case, the pressure sensor 94 is stopped simultaneously with the regeneration-start condition satisfied, and the activation of the pressure sensor 94 starts by the closing of the rough valve 72 (or the opening of the purge valve 74).

As described above, the pressure sensor 94 is restarted in time for the discharging process that is a halfway stage of regeneration (a so-to-speak second stage following the heating process that is the initial stage). In such a second stage, as exemplified by FIG. 4, the internal pressure is allowed to exceed at least 100 Pa (typically atmospheric pressure) in the cryopump 10. The stopped period of the pressure sensor 94 is set so that the activation of the pressure sensor 94 can be completed before the start of a rough-and-purge operation exemplified in FIG. 4.

Note that the second round of rough evacuation and the third round of purge may be added between the termination of the first rough evacuation (S28) and the determination on the stopped period (S30). Rough evacuation and purge may further be added as need arises. If the housing 38 is depressurized to 1/k (atm), for instance, by the first rough evacuation, repeating this n times will ensure that the ratio of purge gas is $1-(1/k)^n$ or above. Parameters k and n are set such that the abundance ratio of inflammable gas falls below an explosion limit. Hence, that the abundance ratio of inflammable gas is in such a minimal level as to be free from explosion hazard is more likely to be ensured in terms of a process design than in the case where the rough evacuation is performed only once. As a result, the pressure sensor 94 can be used under safe conditions.

It is not requisite that the opening and closing of the rough valve 72 and the opening and closing of the purge valve 74 should be done simultaneously in the rough evacuation (S26) and the termination of the rough evacuation (S28). Also, the purge may be continued during the rough evacuation.

Figure 4:
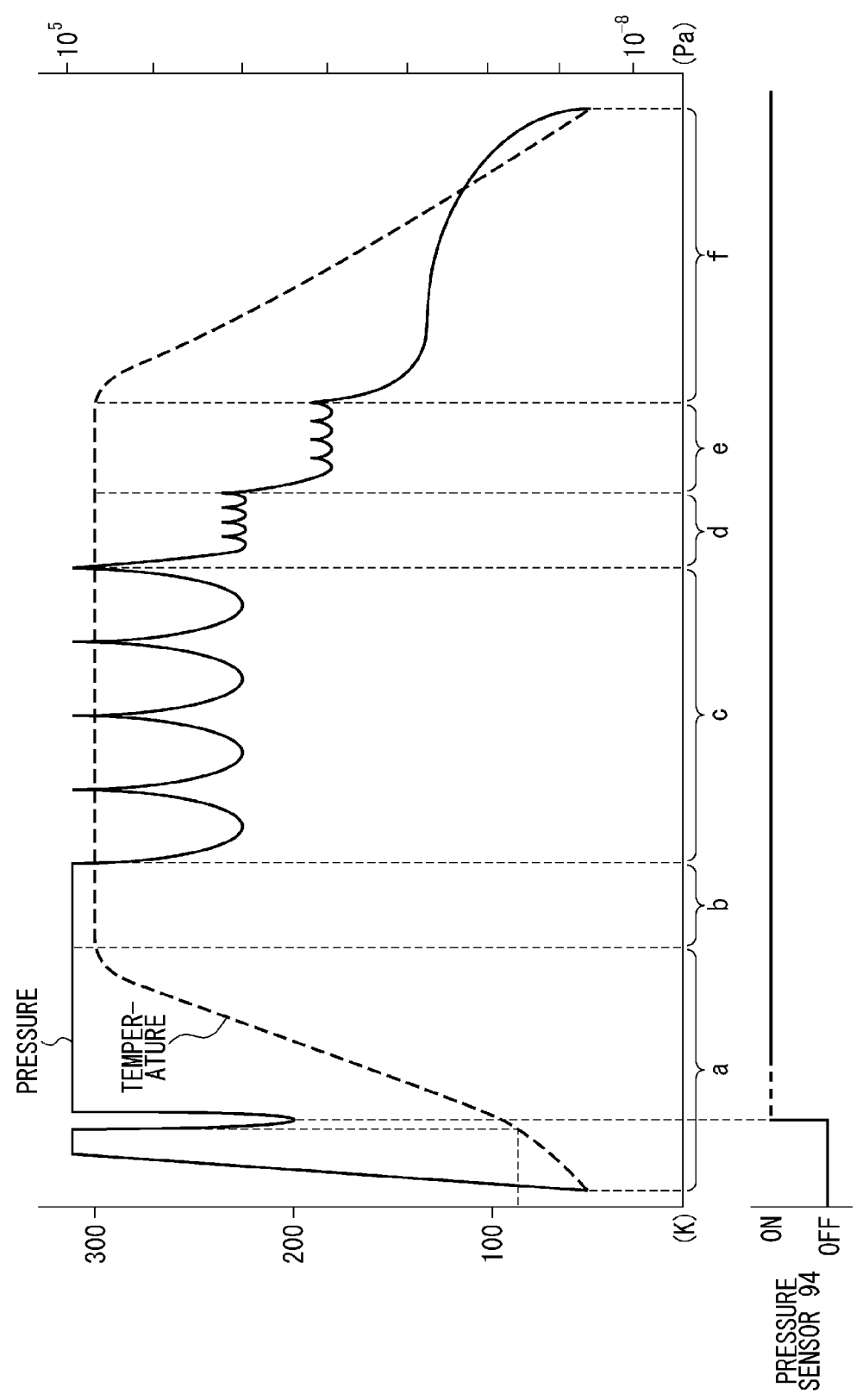
FIG. 4 is a graph showing a regeneration sequence according to an embodiment of the present invention.

FIG. 4 is a diagram showing a regeneration sequence according to an embodiment of the present invention. FIG. 4 schematically shows changes with time in temperature and pressure during a regeneration of the cryopump 10. The temperatures shown in FIG. 4 are those measured by the second temperature sensor 92, and the pressures are those measured by the pressure sensor 94. Also shown at the bottom of FIG. 4 is the on and off of the pressure sensor 94.

The entire period of regeneration sequence from start to finish, as shown in FIG. 4, is divided into six periods of period a to period f. Periods a and b correspond to the above-described heating process, periods c to e to the discharging process, and period f to the cooling process. Period a is for the reversal heating of the refrigerator 16, and period b is for extended purge. Period c is for the rough and purge operation, and periods d and e are for the determination of rate of pressure rise for deciding on the completion of gas discharge. Period f is for the cooling operation of the refrigerator 16.

The pressure sensor 94 is set to off from the beginning of period a. Through the reversal heating and nitrogen purge of the refrigerator 16, the second stage 24 is heated up to a target temperature (e.g., 300 K). As a result of the nitrogen purge, the pressure inside the cryopump reaches the atmospheric pressure quickly. At this time, the hydrogen gas adsorbed by the adsorbent on the second panel 18 is released into the cryopump.

When the second stage 24 has reached the above-mentioned threshold temperature (S24 in FIG. 3), the rough valve 72 is opened for a certain period (e.g., 1 minute). The threshold temperature is 90 K, for instance. During this rough evacuation, the nitrogen purge is stopped and the pressure inside the cryopump is reduced. The hydrogen gas released into the cryopump, together with the nitrogen gas, is discharged by the roughing pump 73.

After the rough valve 72 is closed, the nitrogen purge is resumed, and the pressure inside the cryopump returns to the atmospheric pressure. In resuming the nitrogen purge, the pressure sensor 94 is switched to on. The time period for activation of the pressure sensor 94 is indicated by a broken line at the bottom of FIG. 4. As the second stage 24 reaches the target temperature, the operation of the refrigerator 16 is stopped. The concentration of hydrogen gas in the cryopump is extremely low, or there is substantially no hydrogen gas in the cryopump.

In period b, the nitrogen purge continues. During this nitrogen purge, a rough evacuation may be carried out for the discharge of hydrogen gas. In period b, heating is continued until the temperatures of the first panel 20 and the second panel 18 rise above the melting point of ice.

Period c or period e is used mainly for the discharge of water. In period c, the pressure sensor 94 is turned on from the beginning of the period. In period c, a rough-and-purge operation is performed, in which rough evacuation and nitrogen purge are repeated alternately. The pressure reduction in the cryopump by rough evacuation should be carried out within a pressure range where water does not freeze. The lowest pressure is about 100 Pa, for instance. The first half of period c is a period mainly for the melting of ice. The second half of period c is a period mainly for the discharge of water through vaporization.

Period d is a first roughing period for discharge of water vapor through rough evacuation. At this time, the nitrogen purge is stopped. In period d, the rough evacuation and the determination of rate of pressure rise are repeated. During the determination, the rough evacuation is stopped. When the rate of pressure rise has reached a value smaller than a threshold value (that is, when the pressure after the period of determination after the stop of rough evacuation has lowered below the threshold), period d comes to an end. Period e is a second roughing period for discharging the substances adsorbed by the adsorbent during the regeneration process. In period e, the rough evacuation and the determination of rate of pressure rise are repeated at lower pressures than in period d. When the rate of rise has reached a value smaller than the threshold, period e comes to an end. Note that the pressure range in period d is 100 Pa to 200 Pa, for instance, and the pressure range in period e is 10 Pa to 15 Pa, for instance.

In period f, the cooling operation of the refrigerator 16 is started. At this time, a rough evacuation is also performed. When the target cooling temperature is reached, the rough evacuation is finished. In this manner, the regeneration procedure is completed and a vacuum pumping operation of the cryopump is ready to restart.

In this regeneration sequence, water is discharged from the cryopump 10 by changing the form of water step by step from ice to water to vapor. First ice is melted by raising its temperature. The resulting water is evaporated by lowering the pressure by rough evacuation to the level where freezing does not occur. The water vapor having scattered on the structural surfaces of the cryopump 10 is completely discharged by the use of even lower pressures. In each of the three stages of melting ice, evaporating water, and discharging water vapor, optimum regeneration conditions (pressure, temperature) are used. Thus, this regeneration sequence proves effective in discharging water efficiently and shortening the regeneration time.

In this embodiment, a so-to-speak preliminary discharging process is placed before a main discharging process. The preliminary discharge is performed in the heating process in order to discharge the hydrogen gas. From the start of regeneration till the completion of preliminary discharge, the pressure sensor 94 is stopped. While the pressure sensor 94 is not used in the preliminary discharge, the pressure sensor 94 is used in the main discharging process. Thus, the regeneration process is designed such that the hydrogen gas does not come into contact with the pressure sensor 94 in operation. This design improves the safety of the cryopump 10.

Also, the pressure sensor 94 is restarted after the preliminary discharge and is then used for the monitoring of the internal pressure of the cryopump. The internal pressure of the cryopump is held down by the vent valve 70 in such a manner that the internal pressure thereof does not rise too high relative to the exterior. This also helps improve the safety of the cryopump 10.

The present invention has been described based on the exemplary embodiments and such description is for illustrative purposes only. It is understood by those skilled in the art that various changes in design and the like are possible and that such modifications arising from the changes are also within the scope of the present invention.

It is desirable that the preliminary discharge in the heating process be carried out as early as practicable. The preliminary discharge is done, for instance, when the measured temperature of the second panel 18 (or the second stage 24) is in the range of 30 K to 90 K. In this way, the activation of the pressure sensor 94 can be completed well in advance.

Generally, the gas adsorbed is released from the cryopanel before the gas condensed is released. As already mentioned, the adsorbed gas often contains inflammable gas. On the other hand, the gas condensed on the cryopanel often contains combustion enhancing gas. The preliminary discharge in the initial stage of regeneration can help discharge the inflammable gas earlier. This will prevent the mixing of the inflammable gas that can be released at the beginning of regeneration and the combustion enhancing gas that can be released after that. Thus, the coexistence of a plurality of risk factors, namely, the inflammable gas and the combustion enhancing gas, can be avoided. This will improve the safety of the cryopump.

From a viewpoint of minimizing accident risks, it is desirable that the coexistence of an inflammable gas and a combustion enhancing gas be avoided irrespective of the type of pressure sensor 94. With this feature of this embodiment, therefore, any type of pressure sensor can be used as the pressure sensor 94. The pressure sensor 94 may be of a type without filament. For example, the pressure sensor 94 may be a crystal gauge. The crystal gauge is a sensor for measuring pressures making use of the phenomenon of a quartz oscillator changing its oscillation resistance relative to the pressure. Also, the arrangement may be such that the cryopump 10 is provided with both a pressure sensor for vacuum level measurements and a pressure sensor for atmospheric pressure level measurements.

The object to be removed in the preliminary discharge is not limited to the hydrogen only. The object discharged later than the initial stage of regeneration is mostly moisture, since other components are already released into the housing 38 in the initial stage of regeneration. By the use of the preliminary discharge prior to the main discharge process, the advantage of avoiding the coexistence of a plurality of risk factors is also applicable to inflammable gases other than hydrogen.

It is not absolutely necessary that the restart of the pressure sensor 94 be started during the heating process. For example, where the pressure sensor 94 is not used in the opening and closing of the vent valve 70 (e.g., where the vent valve 70 is mechanically opened and closed), the pressure sensor 94 may be activated in time for the determination of rate of pressure rise in the latter half of the discharge process. In this case, the pressure sensor 94 may be activated after the start of the discharge process.

It should be understood that the invention is not limited to the above-described embodiments, but may be modified into various forms on the basis of the spirit of the invention. Additionally, the modifications are included in the scope of the invention.

Priority is claimed to Japanese Patent Application No. 2012-045268, filed on Mar. 1, 2012, the entire content of which is incorporated herein by reference.

What is claimed is:

1. A cryopump comprising:
    a cryopanel having an adsorption region for adsorbing gas molecules;
    a cryopump housing arranged to enclose the cryopanel;
    a rough valve configured to connect the cryopump housing to a roughing pump;
    a pressure sensor configured to measure an internal pressure in the cryopump housing;
    a control unit configured to control a stopped period of the pressure sensor and regeneration of the cryopanel;
    wherein the stopped period comprises a period during which no current flows through a filament of the pressure sensor;
    wherein the control unit is further configured to set the stopped period for an initial stage of the regeneration and causes the rough valve to open for rough evacuation of the cryopump housing at least once during the stopped period;
    a temperature sensor configured to measure a temperature of the cryopanel,
    wherein the control unit executes a heating control of the cryopanel, in the initial stage, toward a target temperature higher than a temperature at which adsorbed as molecules are released from the adsorption region,
    wherein the control unit executes the rough evacuation, during the heating control, when a temperature measured by the temperature sensor exceeds the temperature at which adsorbed gas molecules are released,
    wherein the stopped period begins immediately before a start of the regeneration and ends after a rough evacuation has been completed, and
    wherein the rough evacuation is completed by closing the rough valve.

2. The cryopump according to claim 1, wherein the control unit activates the pressure sensor upon passage of the stopped period, and
    wherein the control unit operates the pressure sensor in a second stage of the regeneration.

3. The cryopump according to claim 1, further comprising a purge valve configured to connect the cryopump housing to a purge gas source,
    wherein the control unit opens the purge valve, in the initial stage, to purge the cryopump housing and discontinues the purge by closing the purge valve while the rough valve is open, and
    wherein the control unit executes the purge and the rough evacuation a plural number of times during the stopped period.

4. The cryopump according to claim 1, further comprising a vent valve configured to release the internal pressure of the cryopump housing outside,
    wherein the control unit determines whether to open the vents valve or not, based on a result of measurement by the pressure sensor, in a second stage of the regeneration.

5. The cryopump according to claim 1, wherein the control unit executes, in a second stage of the regeneration, a rough and purge in which the rough evacuation of the cryopump housing and supply of purge gas to the cryopump housing are performed sequentially, and
    wherein the stopped period is set such that an activation of the pressure sensor is completed before a start of the rough and purge.

* * * * *